(12) United States Patent
Zhao et al.

(10) Patent No.: US 12,511,787 B2
(45) Date of Patent: Dec. 30, 2025

(54) METHOD, DEVICE AND SYSTEM OF POINT CLOUD COMPRESSION FOR INTELLIGENT COOPERATIVE PERCEPTION SYSTEM

(71) Applicant: Intelligent Fusion Technology, Inc., Germantown, MD (US)

(72) Inventors: Qi Zhao, Germantown, MD (US); Yi Li, Germantown, MD (US); Xin Tian, Germantown, MD (US); Genshe Chen, Germantown, MD (US); Erik Blasch, Arlington, VA (US); Khanh Pham, Kirtland, NM (US)

(73) Assignee: Intelligent Fusion Technology, Inc., Germantown, MD (US)

( * ) Notice: Subject to any disclaimer, the term of this patent is extended or adjusted under 35 U.S.C. 154(b) by 487 days.

(21) Appl. No.: 17/734,858

(22) Filed: May 2, 2022

(65) Prior Publication Data

US 2022/0375134 A1    Nov. 24, 2022

Related U.S. Application Data

(60) Provisional application No. 63/185,246, filed on May 6, 2021.

(51) Int. Cl.
| | |
|---|---|
| *G06T 9/00* | (2006.01) |
| *G01S 17/89* | (2020.01) |
| *G06T 3/00* | (2024.01) |
| *G06V 10/25* | (2022.01) |

(52) U.S. Cl.
CPC .............. *G06T 9/001* (2013.01); *G01S 17/89* (2013.01); *G06T 3/00* (2013.01); *G06V 10/25* (2022.01)

(58) Field of Classification Search
CPC .. G06T 9/001; G06T 3/00; G06T 9/89; G06V 10/25; G01S 17/89
See application file for complete search history.

(56) References Cited

U.S. PATENT DOCUMENTS

2012/0044476 A1*  2/2012  Earhart .................. G01S 17/58
                                            356/4.01
2020/0074866 A1*  3/2020  Delaney ............... G08G 5/0008
2020/0184718 A1*  6/2020  Chiu ......................... G06T 7/20

OTHER PUBLICATIONS

F. Yu, S. Liu, and Y. Zhu, "Real-Time Spatio-Temporal LiDAR Point Cloud Compression," arXiv (Cornell University), Oct. 2020, doi: https://doi.org/10.1109/iros45743.2020.9341071. (Year: 2020).*

(Continued)

*Primary Examiner* — Gregory A Morse
*Assistant Examiner* — Ty Mitchell Beatty
(74) *Attorney, Agent, or Firm* — ANOVA LAW GROUP, PLLC

(57) ABSTRACT

A method for point cloud compression of an intelligent cooperative perception (iCOOPER) for autonomous air vehicles (AAVs) includes: receiving a sequence of consecutive point clouds; identifying a key point cloud (K-frame) from the sequence of consecutive point clouds; transforming each of the other consecutive point clouds (P-frames) to have the same coordinate system as the K-frame; converting each of the K-frame and P-frames into a corresponding range image; spatially encoding the range image of the K-frame by fitting planes; and temporally encoding each of the range images of the P-frames using the fitting planes.

20 Claims, 8 Drawing Sheets

(56) References Cited

OTHER PUBLICATIONS

C. Tu, E. Takeuchi, A. Carballo and K. Takeda, "Point Cloud Compression for 3D LiDAR Sensor using Recurrent Neural Network with Residual Blocks," 2019 International Conference on Robotics and Automation (ICRA), Montreal, QC, Canada, 2019, pp. 3274-3280, doi: 10.1109/ICRA.2019.8794264. (Year: 2019).*
Title={Vehicular Cooperative Perception Through Action Branching and Federated Reinforcement Learning}, author={Mohamed K. Abdel-Aziz and Cristina Perfecto and Sumudu Samarakoon and Mehdi Bennis and Walid Saad}, year={2020}, (Year: 2020).*
Title={Real-Time Spatio-Temporal LiDAR Point Cloud Compression}, author={Yu Feng and Shaoshan Liu and Yuhao Zhu}, year={2020}, eprint={2008.06972}, (Year: 2020).*
Q. Chen, S. Tang, Q. Yang and S. Fu, "Cooper: Cooperative Perception for Connected Autonomous Vehicles Based on 3D Point Clouds," 2019 IEEE 39th International Conference on Distributed Computing Systems (ICDCS), Dallas, TX, USA, 2019, pp. 514-524, doi: 10.1109/ICDCS.2019.00058. (Year: 2019).*
Kumar, Swarun, et al. "CarSpeak: A Content-Centric Network for Autonomous Driving." (2012). (Year: 2012).*

\* cited by examiner

500

METHOD, DEVICE AND SYSTEM OF POINT CLOUD COMPRESSION FOR INTELLIGENT COOPERATIVE PERCEPTION SYSTEM

CROSS REFERENCE TO RELATED APPLICATION

The present application claims priority to U.S. Provisional Application 63/185,246, filed on May 6, 2021, the entire content of which is incorporated herein by reference.

GOVERNMENT RIGHTS

This invention was made with Government support under Contract No. FA864921P0166, awarded by the United States Air Force. The U.S. Government has certain rights in this invention.

FIELD

The disclosure generally relates to the field of autonomous air vehicle (AAV) technology, more particularly, relates to method, device and system of point cloud compression for an intelligent cooperative perception (iCOOPER) system.

BACKGROUND

Three-dimensional (3D) sensors, such as light detection and ranging (LiDAR), stereo cameras, and radar on an AAV have limited visibility due to occlusions, sensing range, and extreme weather and lighting conditions. Cooperative perception can enable an AAV to access sensory information from other AAVs and infrastructure sensors, which can remove blind spots, extend view coverage, and improve object detection precision for better safety and path planning. 3D LiDARs/cameras/radars on AAVs can generate a massive amount of real-time data traffic, even over the capacity of next-generation (5G) wireless networks. On the other hand, a lot of important information will be lost if AAVs only share the types and locations of detected objects. Connected AAVs should intelligently select the information to transmit.

Therefore, there is a need for method, device and system of point cloud compression for an intelligent cooperative perception system, which can overcome the above and other deficiencies.

SUMMARY

One aspect of the present disclosure provides a method of point cloud compression of an intelligent cooperative perception (iCOOPER) for autonomous air vehicles (AAVs). The method comprises: receiving a sequence of consecutive point clouds; identifying a key point cloud (K-frame) from the sequence of consecutive point clouds; transforming each of the other consecutive point clouds (P-frames) to have the same coordinate system as the K-frame; converting each of the K-frame and P-frames into a corresponding range image; spatially encoding the range image of the K-frame by fitting planes; and temporally encoding each of the range images of the P-frames using the fitting planes.

Another aspect of the present disclosure provides a device of point cloud compression of an intelligent cooperative perception (iCOOPER) for autonomous air vehicles (AAVs). The device comprises a controller, and the controller is configured to: receive a sequence of consecutive point clouds; identify a key point cloud (K-frame) from the sequence of consecutive point clouds; transform each of the other consecutive point clouds (P-frames) to have a same coordinate system as the K-frame; convert each of the K-frame and P-frames into a corresponding range image; spatially encode the range image of the K-frame by fitting planes; and temporally encode each of the range images of the P-frames using the fitting planes.

Another aspect of the present disclosure provides a system of point cloud compression of an intelligent cooperative perception (iCOOPER) for autonomous air vehicles (AAVs). The system comprises at least one AAV, and the at least one AAV is configured to receive a sequence of consecutive point clouds; identify a key point cloud (K-frame) from the sequence of consecutive point clouds; transform each of the other consecutive point clouds (P-frames) to have a same coordinate system as the K-frame; convert each of the K-frame and P-frames into a corresponding range image; spatially encode the range image of the K-frame by fitting planes; and temporally encode each of the range images of the P-frames using the fitting planes.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
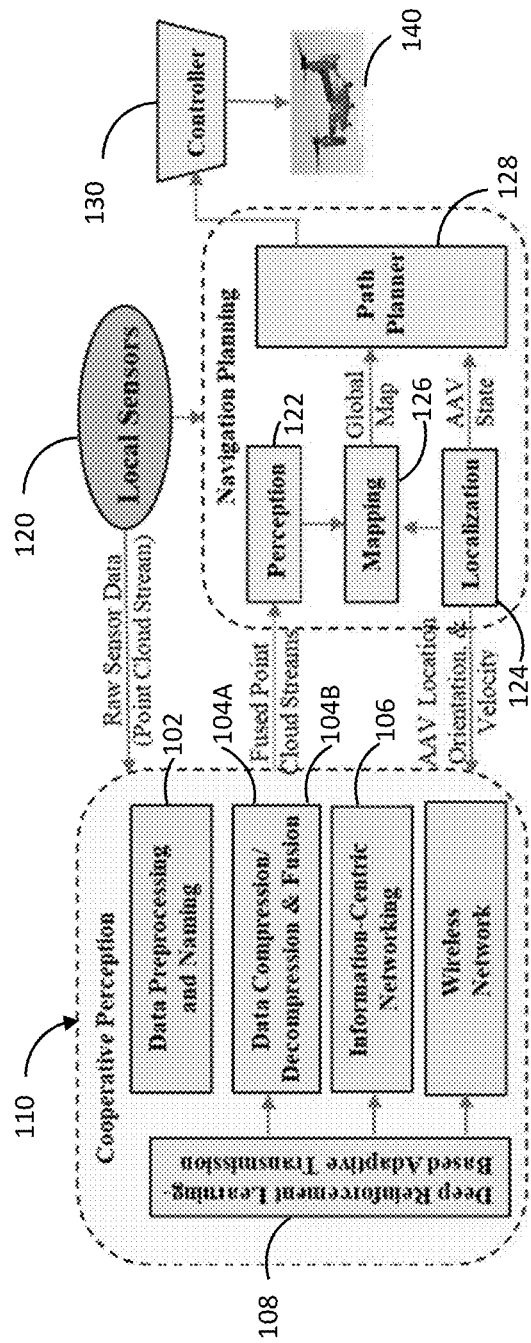
FIG. 1 illustrates an example system of intelligent cooperative perception according to one embodiment of the present disclosure.

Reference will now be made in detail to exemplary embodiments of the disclosure, which are illustrated in the accompanying drawings. Wherever possible, the same reference numbers will be used throughout the drawings to refer to the same or similar parts.

Cooperative perception can enable autonomous air vehicles (AAVs) to share sensory information with other AAVs and infrastructure, extending coverage and enhancing the detection accuracy of surrounding objects for better safety and path planning. Herein, the present disclosure discloses a distributed deep reinforcement learning-based intelligent cooperative perception system with information-centric networking for AAVs. The present disclosure further discloses a point cloud compression method, device and system for the distributed deep reinforcement learning-based intelligent cooperative perception system.

The technical features of the present disclosure may include: 1) information-centric networking (ICN) for flexible and efficient communications; and 2) deep reinforcement learning to select the information to transmit as well as data compression format, mitigating network load, reducing latency, and optimizing cooperative perception. The disclosed embodiments may include the following aspects. 1) The ICN-based communication can allow AAVs to flexibly name, publish, request and retrieve/subscribe sensory information for cooperative perception. It can also allow the name and access to the data based on the sensed region with multiple resolutions. 2) Deep reinforcement learning-based adaptive transmission can dynamically determine the optimal transmission policy of real-time sensed data based on the information importance, location and trajectory, as well as wireless network state to achieve the best cooperative perception in terms of object detection precision and latency. 3) Efficient real-time compression of 3D point cloud streams can significantly reduce the amount of data exchanged among AAVs as well as network load and delay while maintaining accurate cooperative perception based on Recurrent Neural Network (RNN). No important information gets lost. 4) Effective point cloud fusion can compensate for network latency and accurately fuse the sensed data from different AAVs.

As described above, 3D sensors, such as LiDAR, stereo cameras, and radar on an AAV have limited visibility due to occlusions, sensing range, and extreme weather and lighting conditions. Cooperative perception enables AAVs to access sensory information from other AAVs and infrastructure sensors, which removes blind spots, extends view coverage, and improves object detection precision for better safety and path planning. 3D LiDARs/cameras/radars on AAVs generate a massive amount of real-time data traffic, even over the capacity of next-generation (5G) wireless networks. On the other hand, a lot of important information will be lost if AAVs only share the types and locations of detected objects. Connected AAVs should intelligently select the information to transmit.

A deep reinforcement learning-based intelligent cooperative perception (iCOOPER) system supported by information-centric networking (ICN) to enable AAVs is disclosed herein to achieve accurate and fast object detection. For example, the following fundamental problems are addressed. 1) How to efficiently discover and access the information captured by other AAVs? The solution disclosed herein is the information-centric networking (ICN) and region-based naming of sensed information. 2) How to select the information that should be transmitted as well as the data compression format for achieving optimal cooperative perception, under varying wireless bandwidth and delay constraints? The solution disclosed herein is the deep reinforcement learning (DRL)-based adaptive transmission scheme. 3) How to efficiently compress 3D point cloud streams in real-time? The solution disclosed herein is Recurrent Neural Network (RNN)-based point cloud stream compression. 4) How to fuse data contributed by different AAVs? The solution disclosed herein is velocity vector estimation at the sender and network latency compensation at the receiver.

FIG. 1 shows an example system 100 of intelligent cooperative perception according to one embodiment of the present disclosure. The system 100 shows the overall system design and the architecture. The system 100 may include a Cooperative Perception subsystem 110 that obtains cooperative sensory information from local sensors 120 and gives it to the Perception module 122 via an interface similar to how the Perception module accesses the information from its local sensors.

The Cooperative Perception subsystem 110 may include the following exemplary modules: 1) Data Preprocessing and Naming 102: Organize sensory data based on its region in an Octree structure with multiple resolutions; 2) Data Compression 104A: Efficient compression of point cloud data generated by the sensors; 3) Data Decompression & Fusion 104B: decompress the received data and combine it with local point cloud; 4) Information-Centric Networking (ICN) 106: flexibly publish, request and retrieve data for cooperative perception; and 5) Deep Reinforcement Learning-Based Adaptive Transmission Scheme 108: Dynamically decide requested data and data format (resolution and compression).

It should be noted that in AAVs, the Perception module 112 analyzes the point cloud data from the sensors and recognizes objects using detection algorithms such as CNN. The Localization module 124 publishes the AAV's position (as accurate as centimeters), orientation, and velocity state. The Mapper/Mapping 126 generates a global map with positions of detected objects. The path Planner 128 computes a path and handles emergency events. The Controller 130 issues commands to control the AAV 140.

Figure 2:
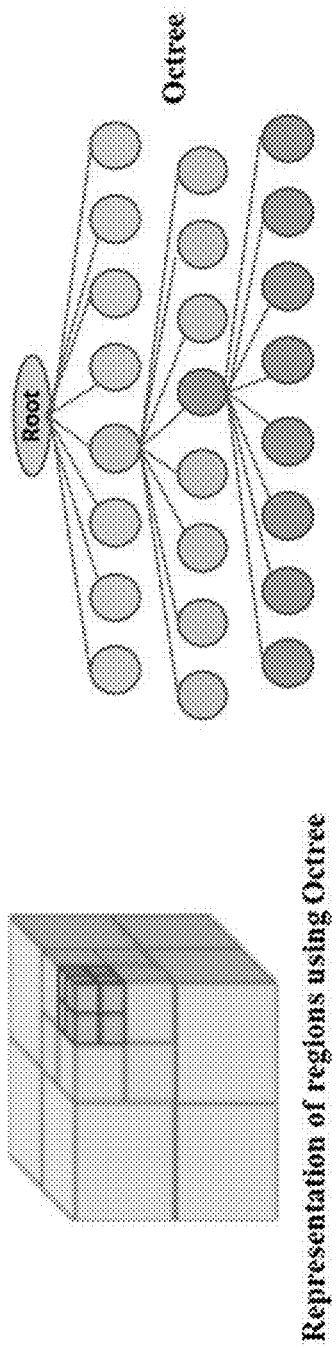
FIG. 2 illustrates an overview of an Octree concept according to one embodiment of the present disclosure.

The information-centric networking 106 enables connected AAVs to exchange sensed information and form an edge computing cloud for cooperative perception. The sensory information is named and accessed based on its 3D regions. The representation of regions is illustrated using Octree with multiple resolutions, each node in the Octree, i.e., each region, has a global unique identifier to distinguish it from other regions, as well as associated attributes (data), as shown in FIG. 2 in which an overview of this Octree concept is described.

An AAV can publish the availability of information sensed for a list of regions as well as data resolution, best quality (a measure of data completeness and compression), and its velocity vector (for prediction of the future sensed region).

AAVs can obtain real-time streams of 3D point clouds from other AAVs and zoom in and zoom out a region by requesting/subscribing to a list of regions with the desired data format (indicating the requested data resolution and compression) and the time duration to subscribe to this data stream.

Figure 3:
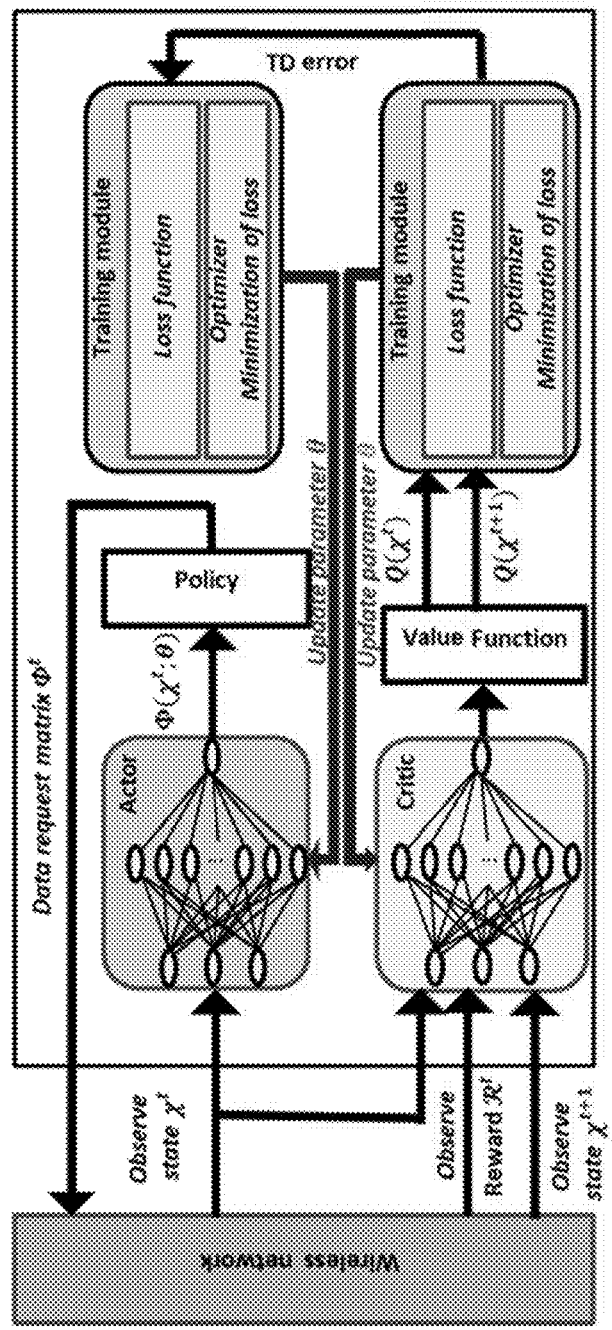
FIG. 3 illustrates an example algorithm diagram for adaptive data selection and scalable transmission according to one embodiment of the present disclosure.

The adaptive data selection and scalable transmission are used for the data processing in the disclosed iCOOPER system. The related algorithms are shown in FIG. 3. At the beginning of a control epoch, t, an AAV analyzes local sensor data and determines a set of regions $\mathcal{S}=\{1, 2, \ldots s \ldots S\}$ for data request based on lacunae in the available sensor data. The importance (weight) $\omega_s$ of each region s is determined based on its relative location and AAV's trajectory. Wireless network state $\chi^t$ (network bandwidth and delay) is observed. Deep reinforcement learning is employed to determine the data requested for different regions in epoch t, $\Phi^t=(\phi_s^t: s \in S)$ with $\phi_s^t$ as data resolution and compression format requested for region s.

The objective is to obtain an optimal data request control policy $\Phi^*$ that maximizes the expected discounted long-term reward, subject to bandwidth and delay constraints. The reward $R(\chi, \Phi)$ is a function of request response time and object detection precision weighted over all the regions. The example algorithm can be developed based on recent advances in deep reinforcement learning, such as Actor Critic neural networks.

To address the bandwidth bottleneck of wireless network, advanced point cloud compression techniques are adopted in the present disclosure, which includes the following exemplary aspects. 1) A point cloud captures the 3D view, from the perspective of a vehicle, of static (e.g., buildings) and dynamic (e.g., other vehicles, pedestrians) objects in the environment. 2) Conventional image/video compression approaches do not work well for point clouds due to the sparseness and data structure. 3) A point cloud compression method using Recurrent Neural Network (RNN) and residual blocks to progressively compress requested sensor data for real-time transmission is adopted and implemented in this disclosure. 4) This approach needs much less volume while giving the same decompression accuracy compared to generic octree point cloud compression methods.

Figure 4:
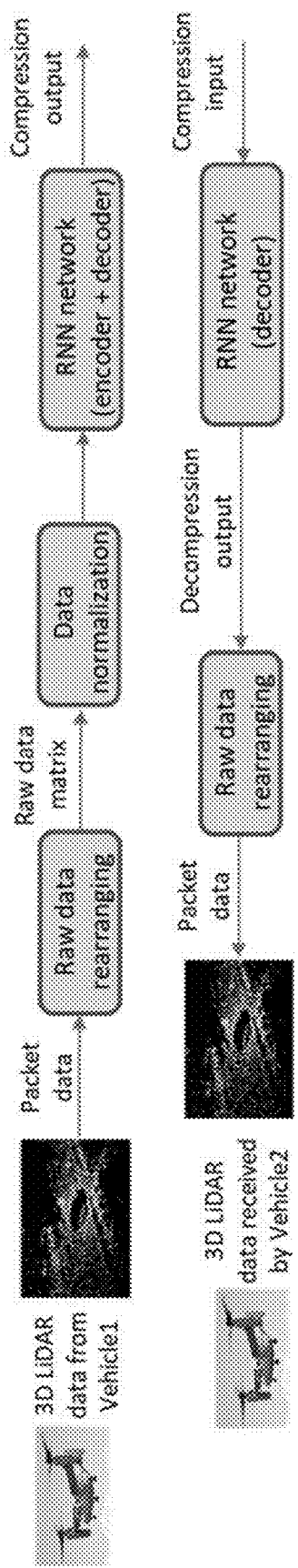
FIG. 4 illustrates an example process of an advanced point cloud compression technique used in the present disclosure according to one embodiment of the present disclosure.

FIG. 4 illustrates an example process 400 of an advanced point cloud compression technique used in the present disclosure. As shown in FIG. 4, the process 400 may include: a first 3D LiDAR captures data from a first vehicle; the data packets are transmitted and the raw data are rearranged to form a raw data matrix; the data matrix is normalized; an RNN network is used to compress the data; the compressed data is then decompressed through the RNN network; the raw data after decompression are rearranged; and the data packets after the rearranging are transmitted to form a second 3D LiDAR data, which are then received by a second vehicle.

An example Real-Time Spatio-Temporal LiDAR Point Cloud Compression method is provided herein. Compressing massive LiDAR point clouds in real-time is critical to autonomous machines such as drones and self-driving cars. While most of the recent prior work has focused on compressing individual point cloud frames, this real-time spatio-temporal LiDAR point cloud compression is disclosed herein as a novel system that effectively compresses a sequence of point clouds. The point cloud compression method/system/device disclosed herein is to exploit both the spatial and temporal redundancies in a sequence of point cloud frames. The present disclosure first identifies a key frame in a point cloud sequence and spatially encodes the key frame by iterative plane fitting. The present disclosure then exploits the fact that consecutive point clouds have large overlaps in the physical space, and thus spatially encoded data can be (re-)used to encode the temporal stream. Temporal encoding by reusing spatial encoding data not only improves the compression rate, but also avoids redundant computations, which significantly improves the compression speed. Experiments show that this compression system can achieve 40× to 90× compression rate, significantly higher than the MPEG's LiDAR point cloud compression standard, while retaining high end-to-end application accuracies. Meanwhile, this compression system has a compression speed that matches the point cloud generation rate by the present LiDARs and out-performs existing compression systems, enabling real-time point cloud transmission.

Figure 5:
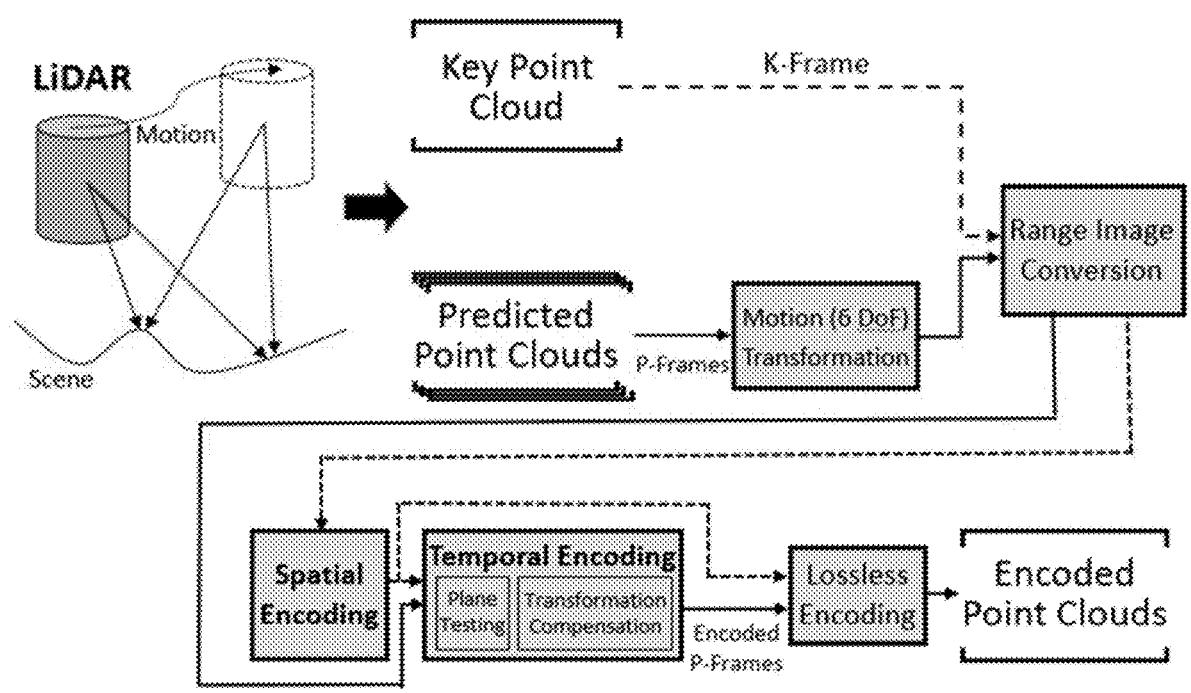
FIG. 5 illustrates an example point cloud compression system/process according to one embodiment of the present disclosure.

FIG. 5 illustrates an example point cloud compression system/process 500. As shown in FIG. 500, the LiDAR(s) capture a sequence of consecutive point clouds of a scene. The sequence of consecutive point clouds is compressed by this system. All the point clouds are converted to range images to accelerate the compression speed. A key point cloud (K-frame) in the sequence (e.g., the middle one) is first spatially encoded. The spatial encoding results of the K-frame are then used to temporally encode the rest of the point clouds, which are referred to as predicted point clouds (P-frames). Details of this point cloud compression system/method are provided below.

The real-time spatio-temporal LiDAR point cloud compression algorithm disclosed herein can be implemented in a customized environment to validate and evaluate the method for the disclosed iCOOPER system. The method/process may include, but is not limited to, the following 4 stages/steps.

Stage 1 is called an identification stage/step. In this step, one key point cloud (K-frame) (e.g., a middle point cloud) is identified and the rest are predicted point clouds (P-frames). P-frames are transformed to K-frame's coordinate system using inertial measurement unit (IMU) measurements. Specifically, this stage contains one key point cloud (K-frame) (middle point cloud) and the rest are predicted point clouds (P-frames). One important process is called a Transformation process, which means that each point cloud has its own coordinate system when generated by the LiDAR and all point clouds are converted to the same coordinate system using a 6 degree of freedom (DoF) (translation and rotation) transformation. That is, every other predicted cloud (P-frame), is transformed into the K-frame's coordinate system by $$p'_{4\times 1} = Mp_{4\times 1} = \begin{bmatrix} R_{3\times 3} & T_{3\times 1} \\ 0_{1\times 3} & 1 \end{bmatrix}_{4\times 4} p_{4\times 1}$$

Where $p_{4\times 1}$ and $p'_{4\times 1}$ denote a point in a predicated cloud before and after transformation, respectively; $T_{3\times 1}$ is called translational acceleration $T_{3\times 1}=[\overline{\Delta x}\ \overline{\Delta y}\ \overline{\Delta z}]$; $R_{3\times 3}$ is a rotational rate matrix $$R_{3\times 3} = \begin{bmatrix} \cos(\overline{\Delta\alpha}) & \sin(\overline{\Delta\alpha}) & 0 \\ -\sin(\overline{\Delta\alpha}) & \cos(\overline{\Delta\alpha}) & 0 \\ 0 & 0 & 1 \end{bmatrix} \quad (5)$$

$$\times \begin{bmatrix} \cos(\overline{\Delta\beta}) & 0 & -\sin(\overline{\Delta\beta}) \\ 0 & 1 & 0 \\ \sin(\overline{\Delta\beta}) & 0 & \cos(\overline{\Delta\beta}) \end{bmatrix}$$

$$\times \begin{bmatrix} 1 & 0 & 0 \\ 0 & \cos(\overline{\Delta\gamma}) & \sin(\overline{\Delta\gamma}) \\ 0 & -\sin(\overline{\Delta\gamma}) & \cos(\overline{\Delta\gamma}) \end{bmatrix}$$

where $\overline{\Delta\alpha}$, $\overline{\Delta\beta}$, and $\overline{\Delta\gamma}$ are rotational displacements integrated from $\hat{\omega}$ using the first-order Runge-Kutta method.

Stage 2 is called a range image conversion stage/step. In this step, after transformation, each point cloud is converted to a range image for subsequent computations. Specifically, every point (x, y, z) in the 3D Cartesian space is converted to a pixel at coordinates (θ, φ) in the range image with a pixel value r:

$$r = \sqrt{x^2 + y^2 + z^2};$$

$$\theta = \arctan\left(\frac{x}{y}\right)/\theta_r; \phi = \arccos\left(\frac{z}{r}\right)/\phi_r$$

Where $\theta_r$ and $\phi_r$ are the horizontal and vertical resolutions of the LiDAR, respectively. If $\theta_r$ and $\phi_r$ are the same as the resolutions of the LiDAR, the range image is a lossless compression of the corresponding point cloud. Larger $\theta_r$ and $\phi_r$ would lead to a lower range image resolution, providing a lossy compression of the original point cloud.

The $\theta_r$ and $\phi_r$ can be adjusted to make the range image conversion to be lossless or lossy, but the entire compression is still lossy. Moreover, p and y are used to define the number of rows and columns in the range map. For example, LiDAR has a field of view (FOV) of 360 horizontally and 30 degrees vertically, then p is the horizontal degree granularity and y is the vertical degree granularity. If p is 0.18, then the range map will have 2000 columns; and if y is 0.45, then the range map has about 67 rows. So, p and y do not have to be in the range 0-1.

Stage 3 is called a spatially encoding stage. In this stage, the K-frame is spatially encoded by fitting planes. All the points that lie on the same plane are encoded by using that plane. Specifically, a "divide and conquer" strategy is used. A range image is divided into unit tiles (e.g., 4×4). Then, it fits a plane for points in the first tile, and gradually grows to include adjacent tiles to form a bigger tile. Each time the tile grows, it will be tested whether the plane fit so far can be used to encode all the points in the new (bigger) tile under a predefined threshold. If so, all the points in the new tile are encoded with the plane. The process is repeated until the range images are processed.

Figure 6:
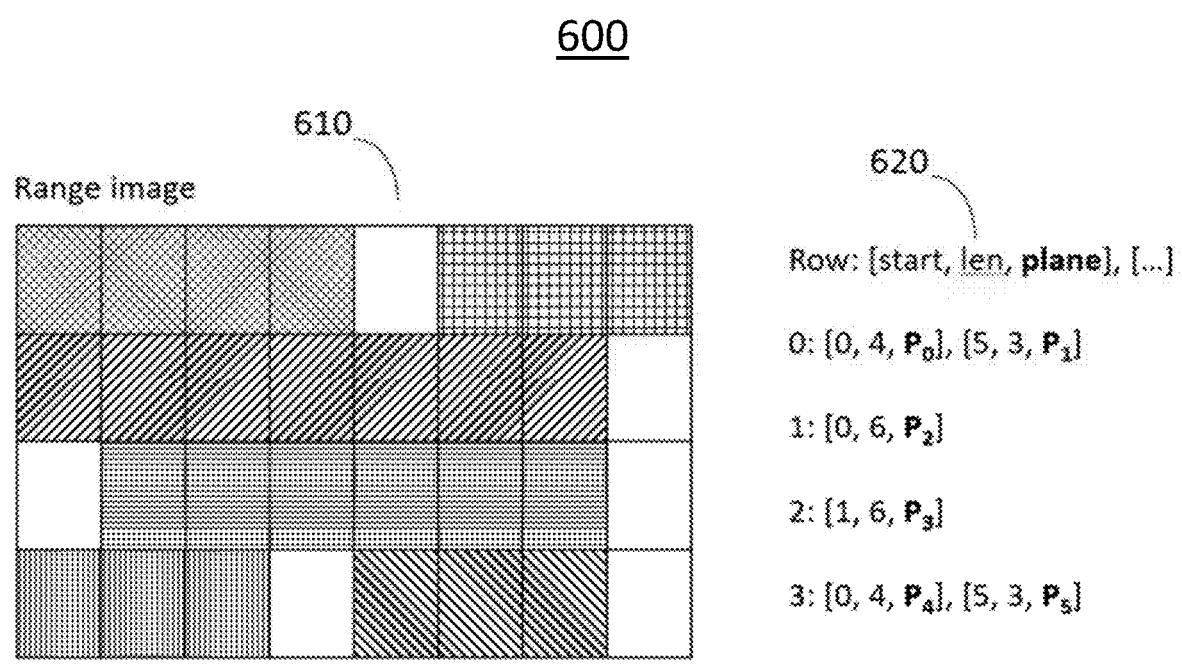
FIG. 6 illustrates an example spatial encoding process according to one embodiment of the present disclosure.

FIG. 6 shows an example spatial encoding process 600. In the example 600, the range image 610 is first tiled, and then iteratively plane-fitted. Horizontally adjacent tiles fitted by the same plane are shaded by the same stripe pattern. Tiles that are plane-fitted are encoded using the format 620. Points in unfitted tiles are encoded individually using their range values (not shown in FIG. 6).

Stage 4 is called a temporal encoding stage. The fitted planes in the K-frame are then (re-) used to temporally encode the P-frames.

Several popular applications are used to evaluate the real-time spatio-temporal LiDAR point cloud compression as follows. For registration, a recent iterative closest point (ICP)-based registration pipeline is developed using the widely-used PCL (point cloud library). For object detection, a second, CNN and PointNet-based approach is used. For scene segmentation, a SqueezeSegV3, CNN-based approach is used.

Then, two different datasets are chosen for the evaluation experiments. One is Karlsruhe Institute of Technology and Toyota Technological Institute (KITTI) dataset, which is for evaluation of registration and object detection. The other one is SemanticKITTI, which is used for the evaluation of segmentation.

As an example KITTI dataset, in a Velodyne laser scanner dataset (bin files), each point is stored with its (x, y, z) coordinate and an additional reflectance value (r). While the number of points per scan is not constant, on average each file/frame has a size of ~1.9 MB which corresponds to approximately 120,0003D points and reflectance values. It should be noted that the Velodyne laser scanner rotates continuously around its vertical axis (counter-clockwise), which can be taken into account using the timestamp files.

The KITTI benchmarks are used for 3D object detection, which includes Car, Pedestrian and Cyclist benchmarks. The dataset contains a training set of 3712 samples, an evaluation set of 3769 samples, and a testing set of 7518 samples.

For scene segmentation, a large-scale Semantic KITTI dataset is used. The dataset has 21 sequences provided by the odometry task, in which there are 11 sequences for training set and 11 sequences for testing set. The dataset contains 28 classes including classes distinguishing non-moving and moving objects. Overall, the classes used herein cover traffic participants, but also functional classes for ground, like parking areas, and sidewalks.

In this disclosure, several baselines are used to compare with the evaluation experiment results to validate whether the disclosed real-time spatio-temporal LiDAR point cloud compression is better than other existing methods. The baselines include 1) G-PCC by MPEG Group designed to compress LiDAR point cloud data, which constructs an Octree for a point cloud and encodes the Octree; 2) V-PCC by MPEG Group designed to compress dense point clouds used in volumetric rendering, which maps point clouds to images and uses existing video compression to compress the images; 3) JPEG which compresses each point cloud's range image individually using the (lossy) JPEG codec; and 4) H.264 which compresses a sequence of point clouds by compressing the corresponding range image sequence using the H.264 video codec, both lossless and lossy.

It is noted that the evaluation formula such as Translation Error, Detection Accuracy, and Segmentation Error can be referred in three applications to have the evaluation formula. If use small p and y values, it should retain more information.

An assessment of performance is evaluated and provided on the validation set using pre-trained models. The 3D object detection results are evaluated by the average precision (AP) and intersection over union (IoU score) is used as the primary accuracy metric in the scene segmentation experiments.

For object detection results, results of object detection are given in terms of average precision (AP) and results of joint object detection and orientation estimation are provided in terms of average orientation similarity (AOS). For cars, a 3D bounding box overlap of 70% is required, while for pedestrians and cyclists, a 3D bounding box overlap of 50% is required. Difficulties are defined as follows: 1) Easy: minimum bounding box height: 40 Px, maximum occlusion level: fully visible, and maximum truncation: 15%; 2) Moderate: minimum bounding box height: 25 Px, maximum occlusion level: partly occluded, and maximum truncation: 30%; and 3) Hard: minimum bounding box height: 25 Px, maximum occlusion level: difficult to see, and maximum truncation: 50%.

TABLE 1

Evaluation results of the real-time spatio-temporal LiDAR point cloud compression using the Second, CNN and PointNet-based approach.

| Benchmark | Easy | Moderate | Hard |
| --- | --- | --- | --- |
| Car (3D Detection) | 88.61% | 78.62% | 77.22% |
| Car (Bird's Eye View) | 90.01% | 87.93% | 86.45% |
| Pedestrian (3D Detection) | 56.55 | 52.98 | 47.73 |
| Pedestrian (Bird's Eye View) | 61.99 | 56.66 | 53.81 |

TABLE 1-continued

Evaluation results of the real-time spatio-temporal LiDAR point cloud compression using the Second, CNN and PointNet-based approach.

| Benchmark | Easy | Moderate | Hard |
| --- | --- | --- | --- |
| Cyclist (3D Detection) | 80.59 | 67.16 | 63.11 |
| Cyclist (Bird's Eye View) | 84.02 | 70.70 | 65.48 |

According to Table 1 above, the Second architecture achieves the highest AP score. Specifically, the Second model has an AP of 78.62% and 88.61% respectively in terms of moderate and easy for 3D detection in Cars. The Second model also has AP of 86.45% and 90.01% for hard and easy difficulties, respectively. In Pedestrian, the Second architecture performs the lowest AP score, in which it has 56.55% and 52.98% on easy and moderate APs, respectively. The Second model also achieves a great detection of Cyclists with a result of 67.16% moderate AP and 80.59% easy AP.

In this disclosure, videos for the object detection evaluation are also recorded. Two kinds of videos have been prepared, which are RGB and LiDAR. Detection results are based on the KITTI validation set. The RGB video is the bird's eye view (BEV) representation of the detected cars. The LiDAR video is from camera images corresponding to those BEVs. Cars are detected as green bounding boxes, cyclists are detected as yellow bounding boxes, and pedestrians are detected as blue bounding boxes.

TABLE 2

Evaluation results of the scene segmentation.

| Acc avg | 0.949 |
| --- | --- |
| IoU avg | 0.788 |
| IoU class 1 [car] | 0.944 |
| IoU class 2 [bicycle] | 0.439 |
| IoU class 3 [motorcycle] | 0.795 |
| IoU class 4 [truck] | 0.775 |
| IoU class 5 [other-vehicle] | 0.871 |
| IoU class 6 [person] | 0.679 |
| IoU class 7 [bicyclist] | 0.735 |
| IoU class 8 [motorcyclist] | 0.736 |
| IoU class 9 [road] | 0.963 |
| IoU class 10 [parking] | 0.838 |
| IoU class 11 [sidewalk] | 0.910 |
| IoU class 12 [other-ground] | 0.754 |
| IoU class 13 [building] | 0.948 |
| IoU class 14 [fence] | 0.831 |
| IoU class 15 [vegetation] | 0.897 |
| IoU class 16 [trunk] | 0.666 |
| IoU class 17 [terrain] | 0.829 |
| IoU class 18 [pole] | 0.666 |
| IoU class 16 [trunk] | 0.599 |
| IoU class 19 [traffic-sign] | 0.771 |

The above Table 2 shows the results of the scene segmentation evaluation results. According to the results in Table 2, the IoU average for 19 classes is 0.788. Specifically, the SqueezeSegV3 architecture performs the segmentation task best in class car, road, sidewalk, and building with an IoU score ranging from 0.91 to 0.96. Meanwhile, further training is necessary for segmentation on class bicycle and class trunk due to lowest IoU score of less than 0.6. The rest of the classes mostly have the IoU score ranging from 0.6 to 0.9.

Videos for this scene segmentation evaluation are also provided. The segmentation video is a 2D spherical projection video, which evaluates using SqueezeSegV3 pre-trained model from sequence 01 of Semantic KITTI dataset. The LiDAR video is the 3D point cloud visualization and camera visualization corresponding to the 2D spherical projection view.

Figure 7:
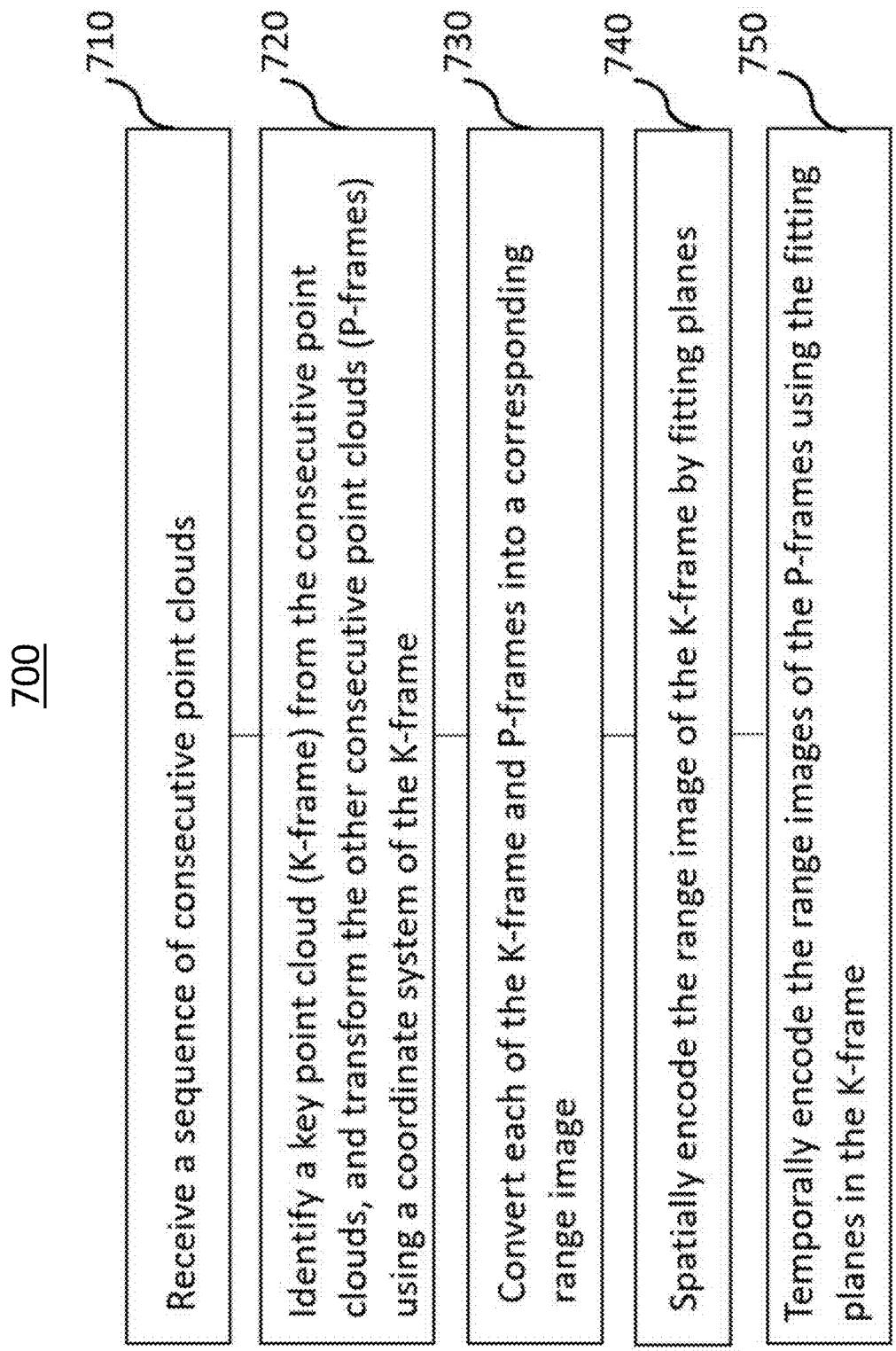
FIG. 7 illustrates an example computer-implemented method of point cloud compression of an intelligent cooperative perception (iCOOPER) for autonomous air vehicles (AAVs) according to one embodiment of the present disclosure.

FIG. 7 shows an example of computer-implemented method 700 of point cloud compression of an intelligent cooperative perception (iCOOPER) for autonomous air vehicles (AAVs), according to an embodiment of the disclosure. The example method 700 may be implemented in the example systems/processes/devices of intelligent cooperative perception (iCOOPER) for autonomous air vehicles (AAVs). The example method 700 may be performed/executed by a hardware processor of a computer system. The example method 700 may comprise, but not limited to, the following steps. The following steps of the method 700 may be performed sequentially, in parallel, independently, separately, in any order, or in any combination thereof. Further, in some embodiments, one or more of the following steps of the method 700 may be omitted, and/or modified. In some embodiments, one or more additional steps may be added or included in the method 700.

In step 710, a sequence of consecutive point clouds is received. For example, the sequence of consecutive clouds may be generated by one or more LiDARs that scan a scene or objects.

In step 720, a key point cloud (referred to as a K-frame) is identified from the consecutive point clouds. For example, the K-frame can be a middle point cloud of the sequence of consecutive point clouds. The other consecutive point clouds (referred to as P-frames) are transformed using a coordinate system of the K-frame. The other consecutive point clouds are the remaining point clouds except for the K-frame. As described above, each point cloud has its own coordinate system when generated by the LiDAR. All point clouds are transformed to have the same coordinate system. In this exemplary embodiment, each of the P-frames is converted using a 6DoF (translation and rotation) transformation to have the same coordinate system as the K-frame. That is, each of the P-frames is transformed into the K-frame's coordinate system using inertial measurement unit (IMU) measurements.

In step 730, after being transformed to have the same coordinate system, each of the consecutive point clouds (i.e., the K-frame and P-frames) are converted into a corresponding range image for subsequent computations. That is, every point (x, y, z) in the 3D Cartesian space of each point cloud is converted to a pixel at coordinates ($\theta$, $\varphi$) in the corresponding range image with a pixel value r.

In step 740, the range image of the K-frame is spatially encoded by fitting planes. As described above, all the points that lie on the same plane are encoded by using that plane. Specifically, a "divide and conquer" strategy is used. The range image of the K-frame is divided into unit tiles (e.g., 4×4). Then, it fits a plane for points in the first tile, and gradually grows to include adjacent tiles to form a bigger tile. Each time the tile grows, it will be tested whether the plane fit so far can be used to encode all the points in the new (bigger) tile under a predefined threshold. If so, all the points in the new tile are encoded with the plane.

In step 750, the fitted planes in the K-frame are then (re-)used to temporally encode the range images of the P-frames. That is, the range images of the P-frames are encoded using the fitted planes in the range image of the K-frame. The process is repeated until the range images are processed.

Figure 8:
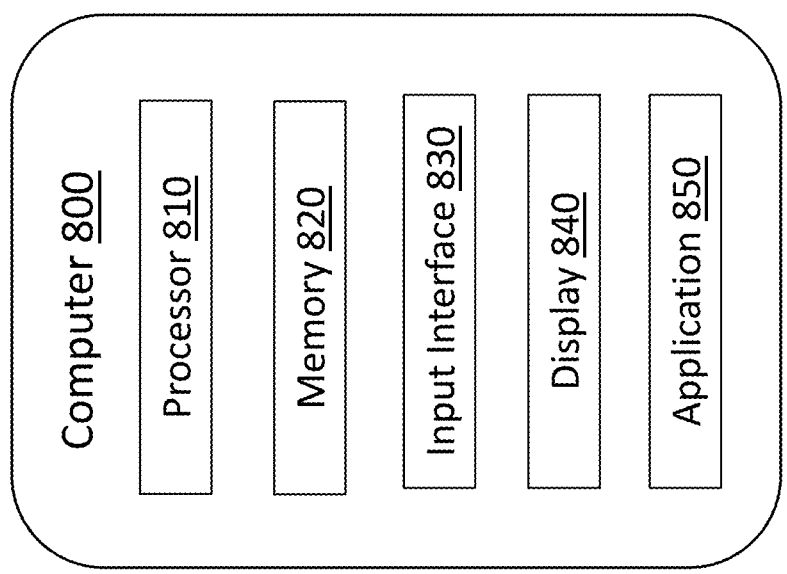
FIG. 8 illustrates an example computer system for point cloud compression of an intelligent cooperative perception (iCOOPER) for autonomous air vehicles (AAVs) according to one embodiment of the present disclosure.

FIG. 8 illustrates an example computer system 800 according to the present disclosure. The computer system 800 may be used in the systems disclosed herein for performing the methods/functions disclosed herein. The computer system 800 may include, but not limited to, a desktop computer, a laptop computer, a notebook computer, a smartphone, a tablet computer, a mainframe computer, a server computer, a personal assistant computer, and/or any suitable network-enabled computing device or part thereof. For example, the computer system 800 may be incorporated in the AAVs, such as in the controller or processor of an AAV (a device). The computer system 800 may comprise a processor 810, a memory 820 coupled with the processor 810, an input interface 830, a display 840 coupled to the processor 810 and/or the memory 820, and an application 850.

The processor 810 may include one or more central processing cores, processing circuitry, built-in memories, data and command encoders, additional microprocessors, and security hardware. The processor 810 may be configured to execute computer program instructions (e.g., the application 850) to perform various processes and methods disclosed herein.

The memory 820 may include random access memory, read-only memory, programmable read-only memory, read/write memory, and flash memory. The memory 820 may also include magnetic disks, optical disks, floppy disks, hard disks, and any suitable non-transitory computer-readable storage medium. The memory 820 may be configured to access and store data and information and computer program instructions, such as the application 850, an operating system, a web browser application, and so forth.

The input interface 830 may include graphic input interfaces and any device for entering information into the computer system 800, such as keyboards, mouses, microphones, digital cameras, video recorders, and the like.

The display 840 may include a computer monitor, a flat panel display, a liquid crystal display, a plasma panel, and any type of device for presenting information to users. For example, the display 840 may comprise the interactive graphical user interface (GUI).

The application 850 may include one or more applications comprising instructions executable by the processor 810, such as the methods disclosed herein. The application 850, when executed by the processor 810, may enable network communications among components/layers of the systems disclosed herein. Upon execution by the processor 810, the application 850 may perform the steps and functions described in this disclosure.

The present disclosure further provides a non-transitory computer-readable storage medium storing instructions that, when executed by one or more processors of one or more computers, cause the one or more processors to perform a method for point cloud compression of an intelligent cooperative perception (iCOOPER) for autonomous air vehicles (AAVs). The method includes: receiving a sequence of consecutive point clouds; identifying a key point cloud (K-frame) from the sequence of consecutive point clouds; transforming each of the other consecutive point clouds (P-frames) to have the same coordinate system as the K-frame; converting each of the K-frame and P-frames into a corresponding range image; spatially encoding the range image of the K-frame by fitting planes; and temporally encoding each of the range images of the P-frames using the fitting planes.

Other embodiments of the disclosure will be apparent to those skilled in the art from consideration of the specification and practice of the invention disclosed herein. It is intended that the specification and examples be considered exemplary only, with a true scope and spirit of the invention being indicated by the claims.

What is claimed is:

1. A method of point cloud compression, selection, transmission and fusion for a distributed deep reinforcement learning-based intelligent cooperative perception (iCOOPER) for autonomous air vehicles (AAVs), comprising:
receiving, via an information-centric networking (ICN)-based communication, a sequence of consecutive point clouds, wherein the sequence of consecutive point clouds are sensory data named based on its region in an Octree structure with multiple resolutions;
identifying a key point cloud (K-frame) from the sequence of consecutive point clouds;
transforming each of the other consecutive point clouds (P-frames) to have the same coordinate system as the K-frame;
converting each of the K-frame and P-frames into a corresponding range image;
spatially encoding the range image of the K-frame by fitting planes;
temporally encoding each of the range images of the P-frames using the fitting planes to obtain a sequence of compressed consecutive point clouds;
determining, via a deep reinforcement learning-based adaptive transmission scheme, an optimal transmission policy for transmitting via the ICN-based communication the sequence of compressed consecutive point clouds based on information importance, location and trajectory, and wireless network state of the AAVs;
decompressing the sequence of compressed consecutive point clouds and fusing the decompressed consecutive point clouds to compensate for network latency of the AAVs; and
controlling the AAVs based on the fused consecutive point clouds, wherein controlling the AAVs includes analyzing the fused consecutive point clouds to detect objects; generating a global map with positions of the detected objects and AAVs position, orientation, and velocity state; computing a path and handling emergency events; and issuing commands to control the AAVs,
wherein the method further comprises evaluating the point cloud compression including applying a recent iterative closest point (ICP)-based registration pipeline using a PCL (point cloud library) for registration; applying a second, CNN and PointNet-based approach for object detection; and applying a SqueezeSegV3, CNN-based approach for scene segmentation.

2. The method of claim 1, wherein the K-frame is a middle point cloud of the sequence of consecutive point clouds.

3. The method of claim 1, wherein:
the sequence of consecutive point clouds is generated by a LiDAR; and
the sequence of compressed consecutive point clouds is obtained via Recurrent Neural Network (RNN)-based point cloud stream compression.

4. The method of claim 1, wherein the action of transforming each of the other consecutive point clouds (P-frames) to have the same coordinate system as the K-frame comprises transforming each of the P-frames to have the same coordinate system as the K-frame using inertial measurement unit (IMU) measurements.

5. The method of claim 1, wherein the action of transforming each of the other consecutive point clouds (P-frames) to have the same coordinate system as the K-frame comprises transforming each of the P-frames to have the same coordinate system as the K-frame using a six degree of freedom (DOF) transformation.

6. The method of claim 1, wherein the action of converting each of the K-frame and P-frames into a corresponding range image comprises converting each point in the same coordinate system to a pixel in the corresponding range image with a pixel value.

7. The method of claim 1, wherein the action of spatially encoding the range image of the K-frame by fitting planes comprises:
dividing the range image of the K-frame into unit tiles; and
encoding the unit tiles using the fitting planes.

8. A device of point cloud compression of an intelligent cooperative perception (iCOOPER) for autonomous air vehicles (AAVs) comprises a controller, the controller configured to:
receive, via an information-centric networking (ICN)-based communication, a sequence of consecutive point clouds, wherein the sequence of consecutive point clouds are sensory data named based on its region in an Octree structure with multiple resolutions;
identify a key point cloud (K-frame) from the sequence of consecutive point clouds;
transform each of the other consecutive point clouds (P-frames) to have the same coordinate system as the K-frame;
convert each of the K-frame and P-frames into a corresponding range image;
spatially encode the range image of the K-frame by fitting planes;
temporally encode each of the range images of the P-frames using the fitting planes to obtain a sequence of compressed consecutive point clouds;
determine, via a deep reinforcement learning-based adaptive transmission scheme, an optimal transmission policy for transmitting via the ICN-based communication the sequence of compressed consecutive point clouds based on information importance, location and trajectory, and wireless network state of the AAVs;
decompress the sequence of compressed consecutive point clouds and fuse the decompressed consecutive point clouds to compensate for network latency of the AAVs; and
control the AAVs based on the fused consecutive point clouds, wherein controlling the AAVs includes analyzing the fused consecutive point clouds to detect objects; generating a global map with positions of the detected objects and AAVs position, orientation, and velocity state; computing a path and handling emergency events; and issuing commands to control the AAVs,
wherein the controller is further configured to evaluate the point cloud compression including applying a recent iterative closest point (ICP)-based registration pipeline using a PCL (point cloud library) for registration; applying a second, CNN and PointNet-based approach for object detection; and applying a SqueezeSegV3, CNN-based approach for scene segmentation.

9. The device of claim 8, wherein the K-frame is a middle point cloud of the sequence of consecutive point clouds.

10. The device of claim 8, wherein:
the sequence of consecutive point clouds is generated by a LiDAR; and
the sequence of compressed consecutive point clouds is obtained via Recurrent Neural Network (RNN)-based point cloud stream compression.

11. The device of claim 8, wherein the action of transforming each of the other consecutive point clouds (P-frames) to have the same coordinate system as the K-frame comprises transforming each of the P-frames to have the same coordinate system as the K-frame using inertial measurement unit (IMU) measurements.

12. The device of claim 8, wherein the action of transforming each of the other consecutive point clouds (P-frames) to have the same coordinate system as the K-frame comprises transforming each of the P-frames to have the same coordinate system as the K-frame using a six degree of freedom (DOF) transformation.

13. The device of claim 8, wherein the action of converting each of the K-frame and P-frames into a corresponding range image comprises converting each point in the same coordinate system to a pixel in the corresponding range image with a pixel value.

14. The device of claim 8, wherein the action of spatially encoding the range image of the K-frame by fitting planes comprises:
dividing the range image of the K-frame into unit tiles; and
encoding the unit tiles using the fitting planes.

15. A system of point cloud compression of an intelligent cooperative perception (iCOOPER) for autonomous air vehicles (AAVs) comprises at least one AAV, the at least one AAV configured to
receive, via an information-centric networking (ICN)-based communication, a sequence of consecutive point clouds, wherein the sequence of consecutive point clouds are sensory data named based on its region in an Octree structure with multiple resolutions;
identify a key point cloud (K-frame) from the sequence of consecutive point clouds;
transform each of the other consecutive point clouds (P-frames) to have the same coordinate system as the K-frame;
convert each of the K-frame and P-frames into a corresponding range image;
spatially encode the range image of the K-frame by fitting planes;
temporally encode each of the range images of the P-frames using the fitting planes to obtain a sequence of compressed consecutive point clouds;
determine, via a deep reinforcement learning-based adaptive transmission scheme, an optimal transmission policy for transmitting via the ICN-based communication the sequence of compressed consecutive point clouds based on information importance, location and trajectory, and wireless network state of the AAVs;
decompress the sequence of compressed consecutive point clouds and fuse the decompressed consecutive point clouds to compensate for network latency of the at least one AAV; and
control the at least one AAV based on the fused consecutive point clouds, wherein controlling the AAVs includes analyzing the fused consecutive point clouds to detect objects; generating a global map with positions of the detected objects and AAVs position, orientation, and velocity state; computing a path and handling emergency events; and issuing commands to control the AAVs,
wherein the at least one AAV is further configured to evaluate the point cloud compression including applying a recent iterative closest point (ICP)-based registration pipeline using a PCL (point cloud library) for registration; applying a second, CNN and PointNet-based approach for object detection; and applying a SqueezeSegV3, CNN-based approach for scene segmentation.

16. The system of claim 15, wherein the K-frame is a middle point cloud of the sequence of consecutive point clouds.

17. The system of claim 15, wherein:
the sequence of consecutive point clouds is generated by a LiDAR; and
the sequence of compressed consecutive point clouds is obtained via Recurrent Neural Network (RNN)-based point cloud stream compression.

18. The system of claim 15, wherein the action of transforming each of the other consecutive point clouds (P-frames) to have the same coordinate system as the K-frame comprises transforming each of the P-frames to have the same coordinate system as the K-frame using inertial measurement unit (IMU) measurements.

19. The system of claim 15, wherein the action of transforming each of the other consecutive point clouds (P-frames) to have the same coordinate system as the K-frame comprises transforming each of the P-frames to have the same coordinate system as the K-frame using a six degree of freedom (DOF) transformation.

20. The system of claim 15, wherein the action of converting each of the K-frame and P-frames into a corresponding range image comprises converting each point in the same coordinate system to a pixel in the corresponding range image with a pixel value.

* * * * *